No. 851,711. PATENTED APR. 30, 1907.
S. TORY.
OVEN.
APPLICATION FILED NOV. 17, 1906.

WITNESSES.
INVENTOR.

No. 851,711. PATENTED APR. 30, 1907.
S. TORY.
OVEN.
APPLICATION FILED NOV. 17, 1906.
2 SHEETS—SHEET 2.
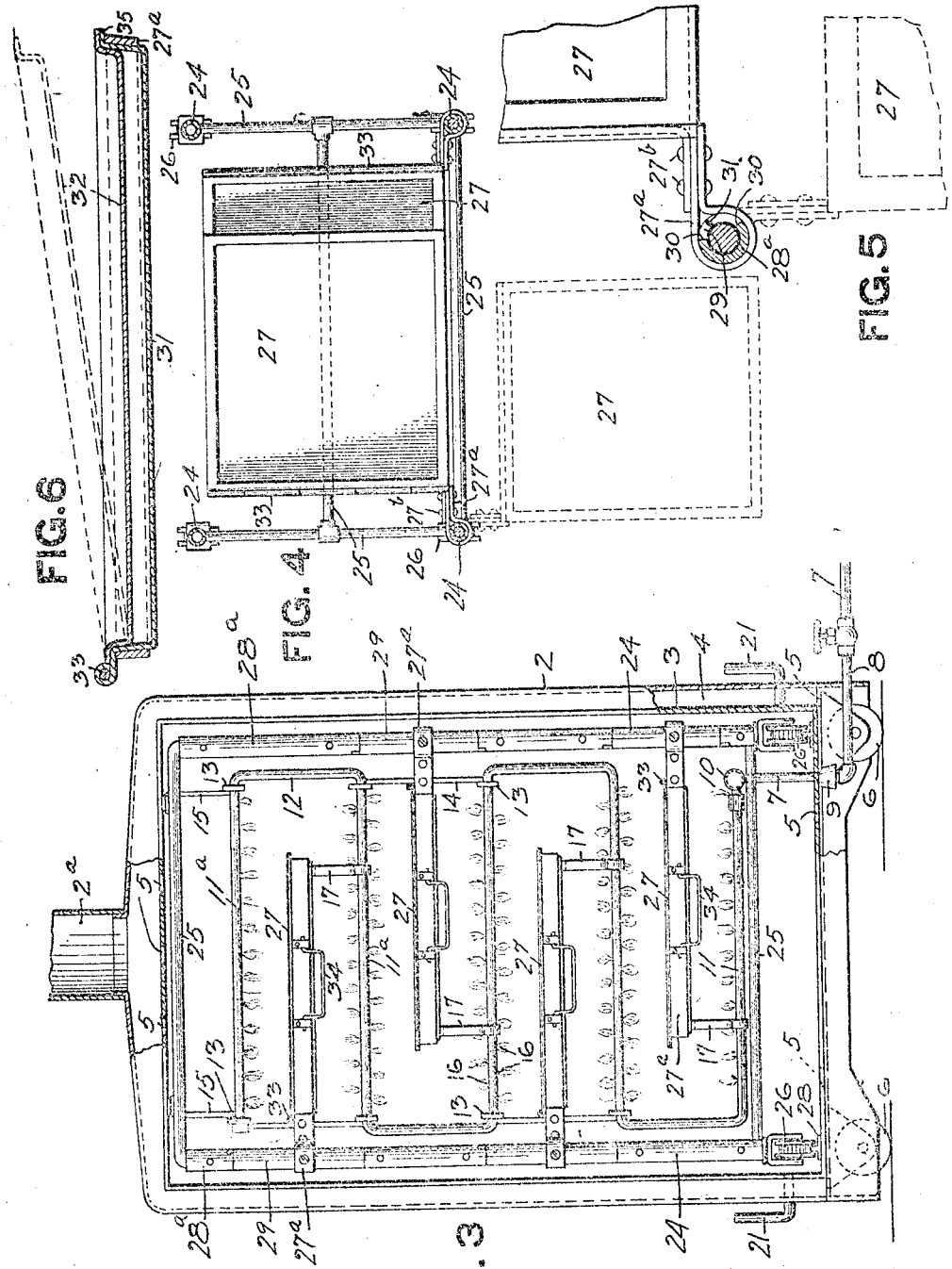
WITNESSES. INVENTOR.

UNITED STATES PATENT OFFICE.

SHINZO TORY, OF PITTSBURG, PENNSYLVANIA, ASSIGNOR OF ONE-FIFTH TO S. HORNER WOOD AND ONE-FIFTH TO JOHN E. BANKS, BOTH OF PITTSBURG, PENNSYLVANIA.

OVEN.

No. 851,711.  Specification of Letters Patent.  Patented April 30, 1907.

Application filed November 17, 1906. Serial No. 343,858.

*To all whom it may concern:*

Be it known that I, SHINZO TORY, a resident of Pittsburg, in the county of Allegheny and State of Pennsylvania, have invented a new and useful Improvement in Ovens; and I do hereby declare the following to be a full, clear, and exact description thereof.

My invention relates to bake ovens, and more especially to an oven adapted for the baking of Japanese rice cakes or other cakes of a like character requiring a hot quick oven.

The object of my invention is to provide an oven in which the pans when inserted are subjected to a high heat on all sides so that the baking is effected in a few moments, and at the same time provide an oven adapted for the baking of a large quantity of the cake at one time, the pans being so arranged as to be quickly inserted and withdrawn from the oven without substantial loss of heat so that the quantity of cake which may be baked in a given period is greatly increased, while at the same time the cost is reduced to a minimum.

To these ends my invention comprises the novel features hereinafter set forth and claimed.

In the drawing Figure 1 is a vertical section of my improved oven showing the rack withdrawn; Fig. 2 is a vertical side elevation of the oven shown, one side removed; Fig. 3 is a front elevation with door removed; Fig. 4 is a cross-section of rack; Fig. 5 is an enlarged cross-section of hinged joint securing pans to rack; and Fig. 6 is a section of one of the pans.

Referring to the drawing the numeral 2 designates the outer shell or casing of the oven which may be formed of sheet metal, and 3 the inner shell or casing. An air space 4 is provided between the two shells which permits of the circulation of air and the shell 3 is provided with openings 5 at the top and bottom, the top openings providing for the escape of the fumes or gases from the oven and the lower openings providing for the admission of air to provide for the proper combustion of the gas, as hereinafter set forth, as well as to create a proper draft. An escape flue 2ª is provided. As I prefer to make my improved oven portable, so that it may be readily moved from one position to another, I mount the oven upon suitable wheels or rollers 6.

A gas supply pipe 7 is provided and to this gas supply pipe a suitable flexible pipe 8 may be connected. The pipe 7 is provided with a suitable air mixer 9. The pipe 7 extends into the inner shell 3 of the oven and is connected with the pipe 10. Connected to the pipe 10 are a series of pipes 11 which are bent to form the horizontal and vertical portions 11ª and 12, respectively. These pipes 11 pass through openings in the bars 13 which hold said pipes in proper position. The bars 13 are connected up by links 14 and to the upper ends of said pipes are secured the hangers 15 suspended from the top of the oven and adapted to support said pipes. The horizontal portions of the pipes 11 are provided at top and bottom with apertures 16 for the escape of the gas so that when the gas is lighted the flame will extend upward and downward from these pipes so as to direct the heat upon the top and bottom of the pans as fully hereinafter set forth.

Supported by the pipes 11 are the supports 17, which act to support the free ends of the pans, as fully hereinafter set forth.

The rear of the oven is provided with the door 18 by means of which access may be had to the rear of the oven, while the front of the oven is closed by means of the door 19. This door 19 has the hooks 20 extending out therefrom, which are adapted to engage the hooks 21 upon the oven so as to form a releasable hinged connection and yet provide for the lowering of the door down upon the floor as indicated in Fig. 1. This door serves two purposes, namely, that of closing the front of the oven, and at the same time affording a platform or car upon which the rack 22 carrying the pans is supported when being introduced or withdrawn from the oven. The outer face of the door 19 is provided with wheels 19ª. This door 19 is provided with the handle 23 by means of which it may be lifted to swing it up in position for closing or by means of which the door may be pulled to move said door from one position to another.

At the top of the oven is the lock or catch 24 which is adapted to engage the upper end of the door and so lock it securely in place when closed.

The rack 22 may be built up of sections of pipe suitably secured together, such as the vertical pieces 24 and the horizontal pieces 25. The rack is further provided with the rollers 26 which are adapted to travel upon the track 26ª formed on the inner face of the door 19, and upon the corresponding track 28 within the oven. The rack 22 carries the pans 27 which are adapted to swing out in position to be filled or to have their contents removed therefrom. Accordingly the front vertical pieces 24 of the rack frame are provided with the sleeves 28ª and 29. The sleeves 28ª are pinned or secured to the pieces 24 so as to be immovable thereon, while the sleeves 29 are adapted to turn upon the pieces 24. To the sleeves 29 are secured the pans 27 and in this manner provision is made for swinging the pans in and out of the rack. A band of metal 27ª encircles each pan, one end of said band encircling the sleeve 29. The ends of said band are secured by rivets 27ᵇ.

In order to control the movement of the pans the permanent sleeves 28ª are provided with the stops 30 which are engaged by the shoulders 31 on the movable sleeves 29, whereby the movement of said movable sleeves 29 is limited and the pans when once swung into the rack are always stopped at the same position, so as to be in alinement with each other and at the same time when swung outward their movement is limited to a certain point. These pans 27 are alternately hinged at opposite sides of the rack and the outer ends of said pans are free. By this construction when the racks are introduced into the oven, the lower-most pans will enter the space between the horizontal portion 11ª of pipe 11 and the adjacent horizontal portion of the pipe 11, while the pan above it and hinged at the opposite side of the rack will enter the space between the adjacent horizontal portions 11ª of the pipe 11. In this manner provision is made for the entrance of the pan between the horizontal portions of the pipe in such manner that the gas when lighted in said pipe will be directed upon the top and bottom of the pans. The supports 17 afford support for the free ends of the pans 27 to prevent their sagging and relieve the strain upon the hinges by means of which said pans are carried.

The pans consist of the lower section 31 which is adapted to contain the batter from which the cake is made, and the upper section 32 is dished or convex in form so as to fit down within the section 31. This upper section 32 is hinged as at 33 to the lower section and the pan is provided with a handle 34 for swinging said pan out and in. The lower section is provided with the flange 35 which engages the band 27ª and is supported thereby. By this construction the pans are removable from the bands and can be readily replaced when burned out.

When my improved oven is in use the rack is conveyed to the point where the pans are to be filled, whereupon the pans are swung out of the rack in suitable position and are filled with the batter from which the cakes are to be made. The pans are then closed and locked and swung back into position within the rack. The rack is then wheeled to the oven and is moved onto the track 26ª of the door 19 which has been previously lowered for the purpose. The rack is then pushed into the oven over the tracks 26ª and onto the tracks 28, the several pans passing into the spaces between the burners in the manner clearly illustrated. The door 19 is then raised and closed. The gas having previously been lighted in the oven the pans will be subjected to heat on all sides and as a consequence the baking will be very quickly accomplished. The heat strikes all sides of the pan and ordinarily it will take but a few moments to bake a thin cake of the character of the Japanese rice cake. As soon as the cake is baked the door 19 is lowered and the rack withdrawn, to be removed from the tracks of the door 19 and another rack may be filled and in position to be immediately inserted in the oven, whereupon the door is closed and the baking operation repeated. The pans of the rack just removed from the oven are then opened and the cake removed, which may then be cut up into any desired size or shape.

By my invention I provide for the continuous operation of the oven, as well as quick and rapid baking of the cake, so that the output of the oven is very large, while at the same time the labor is reduced and the cost of the finished cake is materially decreased.

What I claim is:

1. The combination of an oven, a removable rack therein, horizontally swinging pans carried by said rack, and means for heating said oven.

2. The combination of an oven, a removable rack therein, horizontally swinging pans carried by said rack, stops for said pans, and means for heating said oven.

3. The combination of an oven, a portable rack therein, horizontally swinging pans carried by said rack, the said pans being alternately supported at opposite sides of said rack, and a series of burners, and means for supplying gas to said burners.

4. The combination of an oven, a portable rack therein, horizontally swinging pans carried by said rack, the said pans being alternately supported at opposite sides of said rack, and a series of pipes forming burners above and below said pans, said pipes having apertures above and below, and means for supplying gas to said pipes.

5. The combination of an oven, a portable rack therein, horizontally swinging pans carried by said rack, the said pans being alternately supported at opposite sides of said rack, and a series of pipes forming burners above and below said pipes, shelves carried by said pipes to support the free ends of said shelves, and means for heating said oven.

6. The combination of an oven, a portable rack therein, pans carried by said rack, and a downwardly swinging door having wheels, said door being freely releasable from said oven.

7. The combination of an oven, a portable rack therein, pans carried by said rack, a downwardly swinging door having wheels and freely releasably connected to said oven, tracks on said door upon which the wheels of said rack rest when withdrawn from said oven, and tracks in said oven coinciding with said tracks when the door is lowered 8. The combination of an oven, a portable rack therein, pans carried by said rack, a downwardly swinging door having a freely releasable hinged connection with said oven and adapted to support said rack when withdrawn from said oven.

In testimony whereof I the said SHINZO TORY have hereunto set my hand.

SHINZO TORY.

Witnesses:
 ROBERT C. TOTTEN,
 JOHN F. WILL.